(12) United States Patent
Walker et al.

(10) Patent No.: US 10,691,595 B2
(45) Date of Patent: Jun. 23, 2020

(54) CACHE IN A NON-VOLATILE MEMORY SUBSYSTEM

(71) Applicant: Micron Technology, Inc., Boise, ID (US)

(72) Inventors: Robert M. Walker, Raleigh, NC (US); Ashay Narsale, Newark, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 3 days.

(21) Appl. No.: 16/108,037

(22) Filed: Aug. 21, 2018

(65) Prior Publication Data

US 2020/0065243 A1 Feb. 27, 2020

(51) Int. Cl.
*G06F 12/0804* (2016.01)
*G06F 12/0811* (2016.01)
*G06F 13/16* (2006.01)
*G06F 12/128* (2016.01)

(52) U.S. Cl.
CPC ...... *G06F 12/0804* (2013.01); *G06F 12/0811* (2013.01); *G06F 12/128* (2013.01); *G06F 13/1605* (2013.01); *G06F 2212/222* (2013.01)

(58) Field of Classification Search
None
See application file for complete search history.

(56) References Cited

U.S. PATENT DOCUMENTS

2009/0198925 A1* 8/2009 Hosomi ............. G06F 12/0817
 711/156
2012/0151152 A1* 6/2012 Minami ............. G06F 12/0831
 711/146
2018/0165214 A1* 6/2018 Farmahini Farahani ....................
 G06F 12/0888
2018/0357180 A1* 12/2018 Grant .................. G06F 12/0895

* cited by examiner

*Primary Examiner* — Charles J Choi
(74) *Attorney, Agent, or Firm* — Nicholson De Vos Webster & Elliott LLP

(57) ABSTRACT

A first request to perform an operation at an address associated with a media is obtained. The operation is issued to a plurality of cache divisions, wherein each cache division comprises a cache controller and a cache memory. A location in another memory associated with the first request is updated, the location in the other memory including a plurality of indicators corresponding to a status of the operation with each of the plurality of cache divisions. Based on one or more responses from the cache division(s), a response to the first request is sent.

20 Claims, 5 Drawing Sheets

CACHE IN A NON-VOLATILE MEMORY SUBSYSTEM

TECHNICAL FIELD

The present disclosure generally relates to non-volatile memory, and more specifically, relates to cache in a non-volatile memory system.

BACKGROUND ART

A memory subsystem can be a storage system, such as a solid-state drive (SSD), and can include one or more memory components that store data. The memory components can be, for example, non-volatile memory components and volatile memory components. In general, a host system can utilize a memory subsystem to store data at the memory components and to retrieve data from the memory components. To reduce latency associated with read or write operations to the underlying media backing the storage system, a memory subsystem can include a cache memory that is smaller and faster than the underlying media to improve the performance of the memory subsystem.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to caches in a memory subsystem. A memory subsystem is also hereinafter referred to as a "memory device." An example of a memory subsystem is a storage system, such as a solid-state drive (SSD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

The performance offered by the memory subsystem to the host system can be improved though the use of a cache subsystem. A cache subsystem generally comprises a cache controller and associated cache memory. To avoid situations where the cache subsystem negatively impacts the overall performance of the memory subsystem (e.g., due to a high volume of read and write requests), the cache controller and the cache memory typically operate at a high clock frequency, which ultimately causes the cache subsystem to consume more power and generate more heat.

Aspects of the present disclosure address the above and other deficiencies by dividing the cache subsystem into multiple cache controllers and cache memories. A scheduler distributes read or write operations from the host system to the cache subdivisions thereby permitting each to operate at a lower clock frequency while offering comparable performance to a cache subsystem made up of a single cache controller and cache memory.

Figure 1:
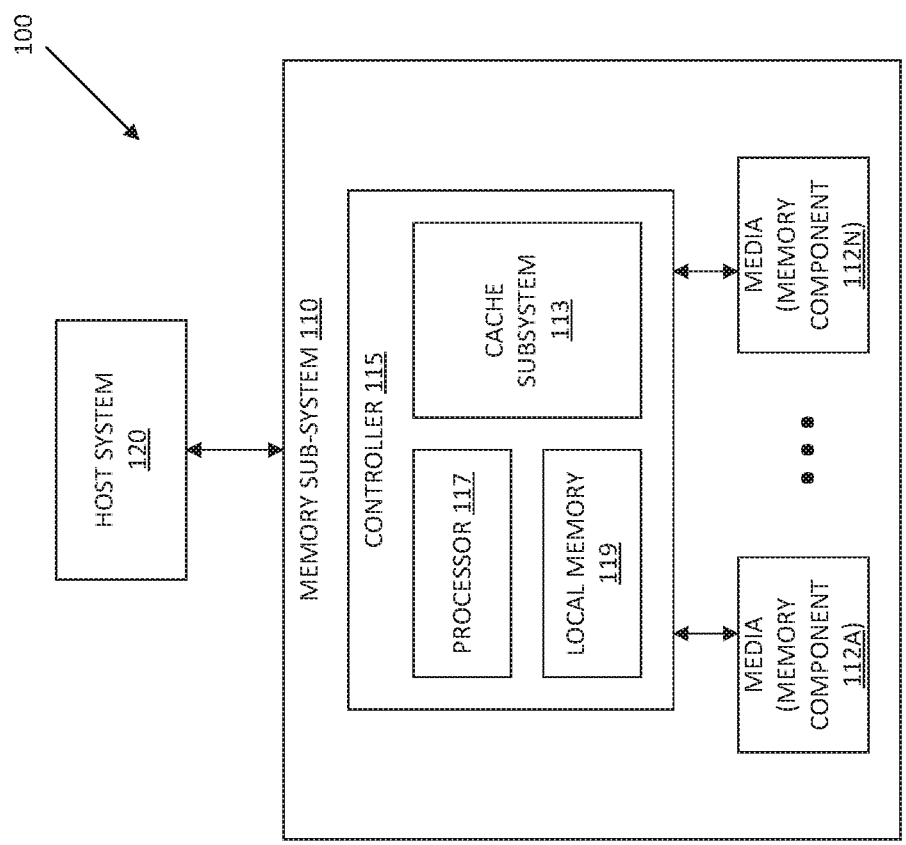
FIG. 1 illustrates an example computing environment that includes a memory subsystem in accordance with some embodiments of the present disclosure.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. Although the local memory 119 is illustrated within controller 115, in some embodiments, one or more internal or external memories accessible to the controller form the local memory 119. While the example memory subsystem 110 in FIG. 1 has been illustrated as including the controller 115, in another embodiment of the present disclosure, an external controller (e.g., an external host, or a processor or controller separate from the memory subsystem) controls the memory subsystem 110.

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a cache subsystem 113. In some embodiments, the controller 115 includes at least a portion of the cache subsystem 113. A combination of hardware components that are part of the controller 115 or coupled to the controller 115 (e.g., an external memory (not shown)) and software executed by the processor 117 implement the cache subsystem 113. For example, the controller 115 can include a processor 117 (processing device) configured to execute instructions stored in local memory 119 for performing some of the operations associated with the cache subsystem 113 as described herein in conjunction with hardware components.

The cache subsystem 113 can improve read and write performance to memory components 112A to 112N while limiting the amount of power consumed and heat generated by the cache subsystem 113. Further details with regards to the operations of the cache subsystem 113 are described below.

Figure 2:
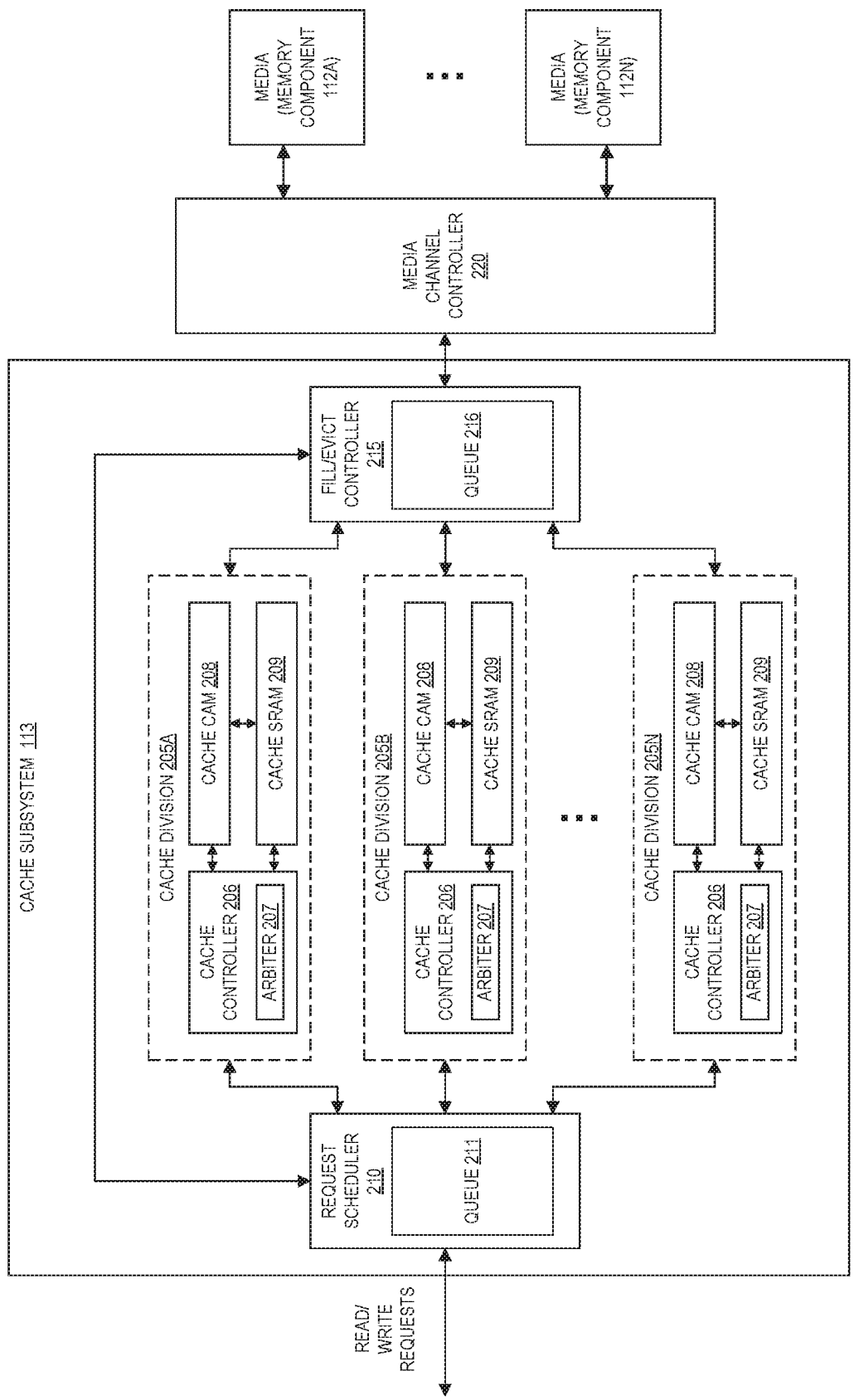
FIG. 2 illustrates an example cache subsystem of the memory subsystem illustrated in FIG. 1 in accordance with some embodiments of the present disclosure.

FIG. 2 illustrates an example cache subsystem 113 of the memory subsystem illustrated in FIG. 1 in accordance with some embodiments of the present disclosure. The cache subsystem 113 receives requests to read from or write to media, either from the host system 120 or from another portion of controller 115 (e.g., read and write operations associated with managing the media for garbage collection, wear-leveling, etc.). If possible, the cache subsystem 113 fulfills the requests by writing to or reading from cache memory. Otherwise, the cache subsystem 113 issues requests to the media (e.g., memory components 112A to 112N). In some embodiments, a media channel controller 220 handles reads from and writes to media.

The cache subsystem 113 includes a plurality of cache divisions 205A-205N, a request scheduler 210, and a fill/evict controller 215. Each cache division 205 includes a cache controller 206, an arbiter 207, and a cache memory. Together, the cache memory in each cache division 205 is the total amount of cache memory (e.g., eight divisions having a 4-kilobyte (K) cache memory forms a 32K cache subsystem). The cache controller 206 outputs one or more control signals to the cache memory to control reads or writes to the cache memory. As described below, the request scheduler 210 and the fill/evict controller 215 read data from and write data to cache divisions 205 via the cache controllers 206.

In the cache memory configuration illustrated in FIG. 2, each cache division memory comprises a content-addressable memory (CAM) 208 and a static random-access memory (SRAM) 209 (together referred to as "cache memory"). In some embodiments, each entry in the CAM includes a media address and a dirty bit. The media address may be a logical address to a location in media (e.g., if the cache subsystem is before a logical to physical address translation stage within the controller 115) or a physical address to a location in media (e.g., if the cache subsystem is after logical to physical address translation or if the addressing scheme is direct-mapped). The dirty bit identifies cache entries associated with write requests. When the dirty bit for an entry is set, it indicates that the data associated with the entry has yet to be written to media. In some embodiments, an entry in the CAM further includes a valid bit to indicate whether the entry contains data that was either read from the media and cached or data received by the cache subsystem for writing to the media, and a reset invalidates all entries.

The cache controller 206 uses the CAM 208 to search for a media address associated with an operation. When the search succeeds (the CAM index includes the media address), the CAM 208 outputs an address for a location in the SRAM 209 that stores data associated with the previous operation associated with the media address. Other cache memory configurations are possible. For example, a direct mapped SRAM, an N-way associative SRAM, etc.

To avoid situations where the request scheduler 210 and the fill/evict controller 215 simultaneously attempt to access a cache division 205, the arbiter 207 controls access to the cache division 205. Although the arbiter 207 is illustrated within the cache controller 206, in some embodiments, the arbiter 207 is separate from the cache controller 206. The arbiter receives requests from the request scheduler 210 and the fill/evict controller 215 (e.g., via a per-requestor request signal line). When either the request scheduler 210 or the fill/evict controller 215 issues a request, the arbiter grants the requestor access to the associated cache controller 206 (e.g., via a per-requestor grant signal line). When both the request scheduler 210 and the fill/evict controller request access, the arbiter grants access to one or the other according to an arbitration policy. Exemplary arbitration policies including alternating between requestors (e.g., if the request scheduler 210 was granted access during the last simultaneous request, the fill/evict controller 215 is granted access during the next simultaneous request) or prioritizing one over the other (e.g., the fill/evict controller 215 is always granted access before the request scheduler 210 or vice versa). In some embodiments, the arbiter asserts a busy signal to indicate that it is processing an operation (e.g., to indicate to the request scheduler 210 that it is processing an operation for the fill/evict controller 215 without the request scheduler 210 having to request access and have it denied). In some embodiments, hard-wired or programmable logic that is part of the arbiter 207 enforces the arbitration policy.

The request scheduler 210 receives requests to read data from media or to write data to media. The request scheduler 210 attempts to fulfill requests via cache memory 208/209. A cache "hit" occurs when the request scheduler 210 can handle a read or write request with cache memory 208/209 without accessing the media 112. For example, if a cache CAM 208 includes an entry for a media address, the request scheduler 210 can return (in the case of a read) or overwrite (in the case of a write) the data stored in the associated cache SRAM 209. In this manner, the cache memory 208/209 fulfills reads from the most recently written data and fulfills writes by storing the most recently written data. A cache "miss" occurs when the request scheduler 210 is unable to respond to a read or write request without issuing a fill request to the fill/evict controller 215. In a cache subsystem 113 with multiple cache divisions 205, the request scheduler 210 checks each cache division 205 for a hit on an operation before deeming the operation a cache miss and issuing a fill request, as described below.

Media read or write requests are enqueued in a media operation queue 211, where each entry in the queue 211 is associated with a request. Queue 211 may be a data structure such as a list or an array stored in the local memory 119 that allows read or write requests to be added or removed (e.g., by the request scheduler 210). Note that in some embodiments, the queue 211 allows the request scheduler 210 to randomly read or write from the queue rather than access the queue in a first-in, first-out order. Either the request scheduler 210 or the upstream process(es) issuing requests can add entries to the queue 211. In some embodiments, each entry in the queue 211 contains a field (e.g., a location in the memory associated with the entry) containing an identifier assigned by the request scheduler 210 to track the operation as it is processed within the cache subsystem 113, a field containing an indication of the type of request (e.g., a read or a write), a field having the media address associated with the request, a field for user data or a pointer to a location in a buffer for user data, and a field containing a flag for each cache division to track whether the cache division has been checked for a cache entry associated with the media address.

Additional details regarding the operation of the request scheduler 210 are described below with reference to FIG. 3.

The fill/evict controller 215 performs data movement operations between cache memory and media. Two such data movement operations are "fill" operations (writing data to cache memory) and "evict" operations (e.g., reading data from cache memory and, possibly, writing it to media). When performing a fill operation associated with a read request, the fill/evict controller 215 issues a read to media, and, once the media returns the data located at the address, the fill/evict controller 215 writes the data to the cache memory. When performing a fill operation associated with a write request, the fill/evict controller 215 writes the data associated with the write to the cache memory. Regardless of whether a fill operation is associated with a read or a write, when the cache memory is full, the fill/evict controller 215 also performs evict operations. When performing an evict operation, the fill/evict controller 215 identifies the next location in cache memory to evict and, if the entry is flagged as dirty, writes the data stored in the cache entry to media. Evicting entries in the cache memory makes room for data associated with more recent operations received by the request scheduler 210.

The fill/evict controller 215 handles fill requests stored in a queue 216. Queue 216 may be a data structure such as a list or an array stored in the local memory 119 that allows fill requests to be added or removed (e.g., the fill/evict controller 215, the request scheduler 210). Note that in some embodiments, the queue 211 allows the request scheduler 210 to randomly read or write from the queue rather than access the queue in a first-in, first-out order. Fill requests come from the request scheduler 210 after it has searched each of the divisions in cache memory and determined there was a miss (no cache division 205 included data associated with the media address). In some embodiments, each entry in the queue 216 includes a field (e.g., a location in the memory associated with the entry) containing the identifier assigned to the read or write operation by the request scheduler 210, a field containing an indication of the type of request (e.g., a read or a write), a field having the address associated with the fill request, and a field for user data or a pointer to a location in a buffer for user data.

Additional details regarding the operation of the fill/evict controller 215 are described below with reference to FIG. 4.

Although the request scheduler queue 211 and the fill/evict controller queue 216 are illustrated separately in FIG.

2, in some embodiments the cache subsystem 113 maintains a single queue. Entries in the single queue are as described above for the queue 211 with the addition of a flag to indicate whether the operation associated with the entry is assigned to the request scheduler 210 or the fill/evict controller 211. On receipt of new operations, the request scheduler initially sets the flag in an entry to indicate the operation associated with the entry is being handled by the request scheduler 210. If the checking of cache divisions 205 results in a miss, the request scheduler 210 can modify the flag to indicate that the operation associated with the entry should be handled by the fill/evict controller 215. The fill/evict controller 215 monitors the queue for entries having the flag set for the fill/evict controller 215 and performs the fill and evict operations to complete the operation. Once the fill operation is complete (and the evict operation, if necessary), the fill/evict controller 215 can modify the flag to indicate that the operation associated with the entry can be finished by the request scheduler 210.

Figure 3:
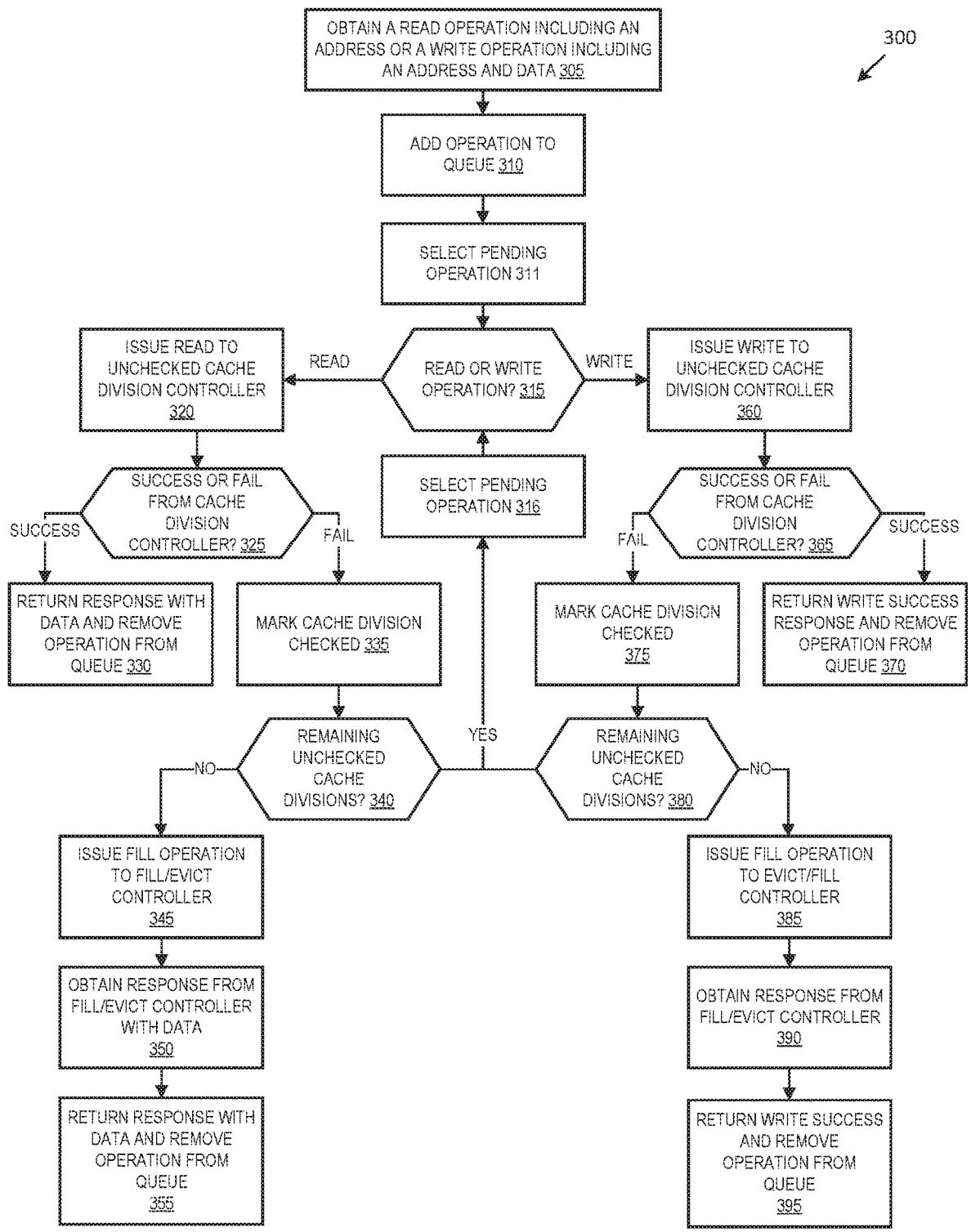
FIG. 3 is a flow diagram of an example method to check the cache subsystem for entries related to read or write operations to the media in accordance with some embodiments of the present disclosure.

FIG. 3 is a flow diagram of an example method 300 to check the cache subsystem for entries related to read or write operations to the media in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the cache subsystem 113 of FIG. 1, such as by the request scheduler 210. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 305, the processing device obtains a request to perform an operation associated with an address in media. For example, the request scheduler 210 receives the request from the host system 120 or another media management process that is part of controller 115, or otherwise obtains the request from another queue (not shown) outside of the cache subsystem 113. The request may be a request to write data to an address in media or to read data from an address in media.

At block 310, the processing device adds the request to a queue of requests to track the status of the request within the cache subsystem. As mentioned above, an exemplary queue entry includes a number of fields, such as an identifier assigned to the request (to track the request), a type of request (e.g., read or write), data or a pointer to a location including data (in the case of a write operation) or space or a pointer to a location for data (in the case of a read operation), and a flag for each cache division to indicate the status of checking the division.

At block 311, the processing device selects one of the pending operations in the queue for processing. In one embodiment, the selection of an operation depends on the operation scheduling policy implemented by the processing device. A variety of operation scheduling policies can be used. In some embodiments, the selection depends on the age of the operation in the queue, the number of outstanding cache divisions that have yet to be checked, whether a busy signal from a cache division arbiter 207 indicates that an unchecked division is busy, or some combination of these or other factors. Although the subsequent operations are illustrated in sequence, in some embodiments the processing device selects and processes multiple operations in parallel (e.g., to different cache divisions).

At block 315, the processing device determines whether the received operation is a read operation or a write operation. In the case where the operation is a read operation, method 300 continues to blocks 320 through 355. In the case where the operation is a write operation, method 300 continues to blocks 360 through 395. Although the operations 320 through 355 and 360 through 395 are illustrated and described as checking a single cache division 205, in some embodiments the processing device checks multiple cache divisions 205 in parallel for a single operation.

At block 320, the processing device checks for a cache hit in a cache division 205. The cache division 205 that the processing device attempts to access depends on the cache division scheduling policy implemented by the processing device. In checking for a hit, the processing device issues a read operation (including the address) to the cache division 205. In the cache memory configuration illustrated in FIG. 2, the cache controller 206 uses the address to search the cache CAM 208. When there is a match, the cache CAM 208 outputs an address to the corresponding cache SRAM 209 so the cache controller 206 can read the data from the cache SRAM 209 and provide the data with a successful response to the processing device checking for the hit.

The processing device can use various cache division scheduling policies to determine which cache division is checked. For example, the processing device can check each unchecked cache division in sequence or check the next available cache division 205 in the order they become available, including checking multiple cache divisions 205 in parallel. For example, if the queue entry indicates that some number of cache divisions remain unchecked, the processing device arbitrates for access to each of the unchecked cache divisions 205 (via arbiters 207) and issue the operation to those cache division arbiters that grant access first. In some embodiments, if the unchecked cache division is busy or otherwise does not immediately grant access to the processing device, the processing device returns to block 311 to process another operation (or to delay processing the current operation).

At block 325, the processing device determines whether the response from the cache controller 206 indicates there was a hit or a miss associated with the operation within the respective cache memory 208/209. Given that the response corresponds to a read operation, a successful response includes the receipt of data from the cache memory 208/209. In the case of a cache hit, at block 330, the processing device returns the received data from the cache division 205 for the upstream process that initiated the request and removes the operation from the queue 211.

At block 335, in the case of a cache miss, the processing device marks the cache division as checked in the queue entry associated with the request (e.g., with a checked/unchecked cache flag). At block 340, if the processing device determines there are other cache divisions that have not been checked, operations continue to block 316, where the processing device selects the same or a different operation in the queue based on the operation scheduling policy (i.e., as described above for block 311). In some embodiments, after determining that there are other cache divisions that have not been checked at block 340, operations return to block 320, where the processing device continues processing the operation selected at block 311. If the processing device has checked each of the cache divisions and each resulted in a miss, operations proceed to block 345. At block 345, the processing device issues a fill operation (to retrieve the data from media and write it to cache) to the fill/evict controller 215.

At block 350, the processing device obtains a response from the fill/evict controller 215. The response contains (or points to) data read from media 112. In some embodiments, the response from the fill/evict controller 215 identifies a cache division 205 that the fill/evict controller 215 filled with the data read from media as described below with reference to FIG. 4. The processing device arbitrates for and obtains access to the identified cache division 205 (without searching all of the cache divisions 205) to obtain the data. Once the processing device has obtained the data for the read operation, the processing device returns the data to the upstream process that initiated the request and removes the operation from the queue, as indicated at block 355.

Returning to block 315, in the case of a write operation, method 300 continues to blocks 360 through 395. The operations at blocks 360 through 395 are similar to the operations described above for blocks 320 through 355.

At block 360, the processing device checks for a cache hit in a cache division 205. The particular cache division 205 that the processing device attempts to access depends on the cache division scheduling policy implemented by the processing device. In checking for a hit, the processing device issues a write operation (including the address and data) to the cache division 205. In the cache memory configuration illustrated in FIG. 2, the cache controller 206 uses the address to search the cache CAM 208. When there is a match, the cache CAM 208 outputs an address to the corresponding cache SRAM 209 so the cache controller 206 can write the data to the cache SRAM 209. The cache controller 206 also updates the dirty bit in the CAM to indicate to the fill/evict controller 215 that the data is to be written to media upon eviction. As described above, various cache division scheduling policies determine which cache division is checked.

At block 365, the processing device determines whether the response from the cache controller 206 indicates that there was a hit or a miss associated with the operation within the respective cache memory 208/209. Given that the response corresponds to a write operation, a successful response includes a write acknowledgment from the cache controller 206. In the case of a cache hit, at block 370, the processing device issues a write acknowledgment for the upstream process that initiated the request and removes the operation from the queue 211.

At block 375, in the case of a cache miss, the processing device marks the cache division as checked in the queue entry associated with the request (e.g., with a checked/unchecked cache flag). At block 380, if the processing device determines there are other cache divisions that have not been checked, operations continue to block 316, where the processing device selects the same or a different operation in the queue based on the operation scheduling policy (i.e., as described above for block 311). In some embodiments, after determining that there are other cache divisions that have not been checked at block 380, operations return to block 360, where the processing device continues processing the operation selected at block 311. If the processing device has checked each of the cache divisions and each resulted in a miss, operations proceed to block 385. At block 385, the processing device issues a fill operation (to write the data to cache) to the fill/evict controller 215.

At block 390, the processing device obtains an acknowledgment response from the fill/evict controller 215. For example, the request scheduler 210 receives a response from the fill/evict controller 215. At block 395, the processing device returns a successful response to the upstream process that initiated the request and removes the operation from the queue.

In some embodiments, hard-wired or programmable logic that is part of the processing device performing the method 300 enforces the cache division scheduling policies.

Figure 4:
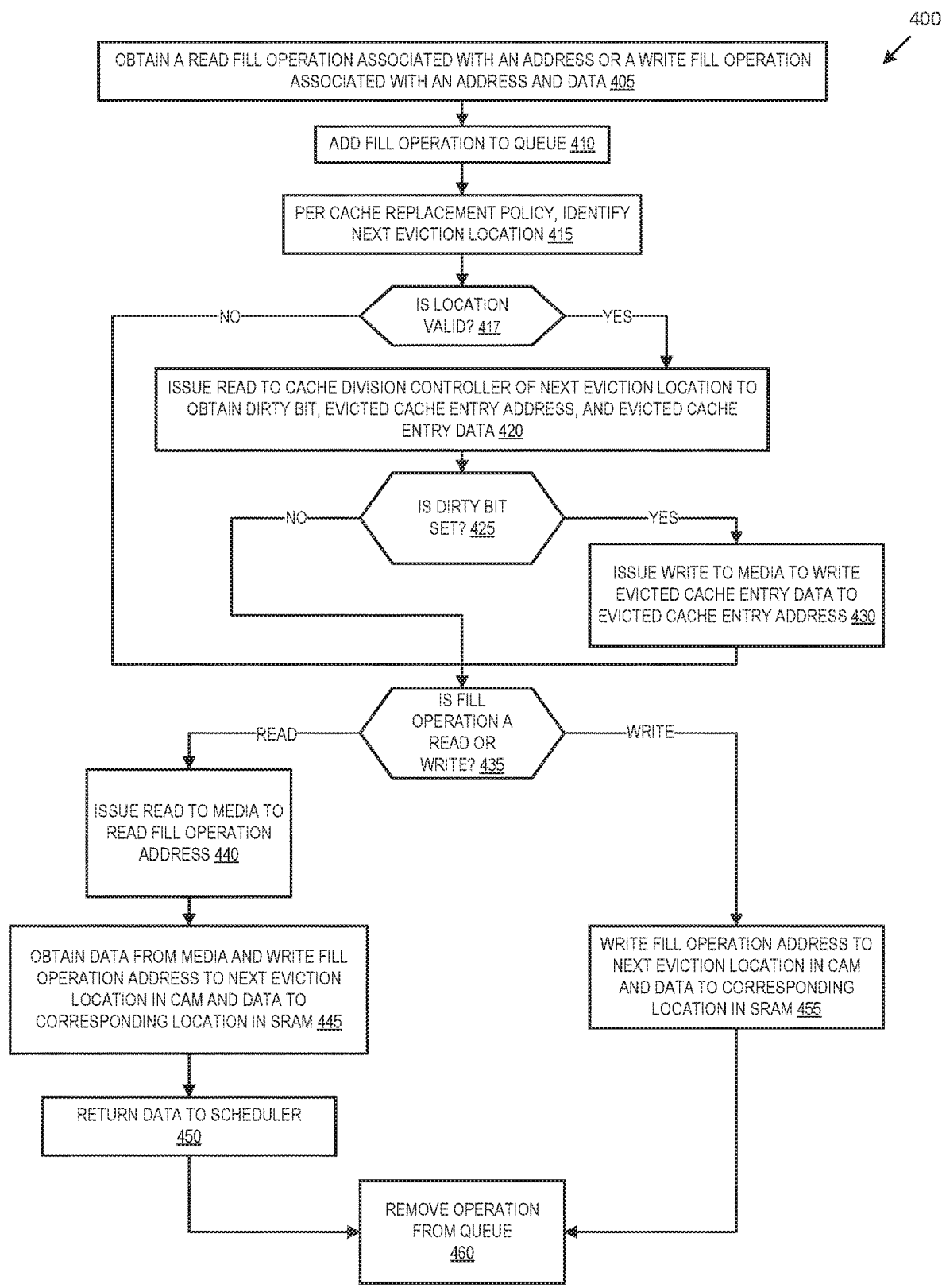
FIG. 4 is a flow diagram of an example method to move write data from the cache subsystem to media and to move read data from media to the cache subsystem in accordance with some embodiments of the present disclosure.

FIG. 4 is a flow diagram of an example method 400 to move write data from the cache subsystem 113 to media 112 and to move read data from media 112 to the cache subsystem 113 in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the cache subsystem 113 of FIG. 1, such as by the fill/evict controller 215. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 405, the processing device obtains a read fill operation associated with an address or a write fill operation associated with an address and data. For example, the fill/evict controller 215 receives a message from the request scheduler 210 or obtains the message from a message-passing queue between the fill/evict controller 215 and the request scheduler 210 (not shown). The message indicates whether the operation is a read fill (with an associated media address) or a write fill (with an associated media address and data). At block 410, the processing device adds the fill operation to a queue 216. While FIG. 2 depicts the fill operation queue 216 and the media operation queue 211 as separate queues, in some embodiments a single queue performs both functions where a per-entry flag indicates whether the request scheduler 210 or fill/evict controller 215 is responsible for handling the entry.

At block 415, the processing device identifies the next eviction location based on a cache replacement policy. The processing device identifies eviction locations based on a cache replacement policy, such as a first-in first-out (FIFO) policy (replacing the oldest entries), a least recently used policy (replacing the entry was last accessed prior to all other entries), etc. In a simple FIFO policy, the processing device maintains two counters to address the cache divisions: one that is used to select a particular cache division and another that is used to select a location within a cache division. The counter that selects an entry within a division increments once the counter that selects a division has incremented through each available division. In this manner, the processing device sequentially selects the first entry of each cache division for eviction, then sequentially selects the next entry of each cache division, etc. In some embodiments, hard-wired or programmable logic that is part of the processing device enforces the cache replacement policy.

In some embodiments, the method 400 includes block 417. At block 417, the processing device determines whether the eviction location includes valid data. To do so, the processing device reads the identified eviction location to obtain a valid bit or tracks whether the processing device has previously filled all of the available cache locations in prior operations. In embodiments where the processing device uses a valid bit, the processing device issues a read operation to the cache division controller 206 that controls the division having the location identified for eviction. Again, the processing device arbitrates for access to the cache division 205 via the arbiter 207 since as the request scheduler 210 may be checking for hits/misses). During this read operation, the processing device obtains the valid bit of the eviction location and may further obtain the address, data, and dirty bit associated with the previous cache entry. If the valid bit is set, or if the processing device has previously filled all of the available cache locations, operations continue to block 420, otherwise, operations continue to block 435.

At block 420, the processing device issues a read operation to the cache division controller 206 that controls the division having the location identified for eviction to obtain the address, data, and dirty bit associated with the previous cache entry (e.g., if not obtained along with a valid bit at block 417). Again, the processing device arbitrates for access to the cache division 205 via the arbiter 207 (as the request scheduler 210 may be checking for hits/misses).

At block 425, the processing device checks whether the dirty bit was set. If so, at block 430, the processing device issues a write operation to the media to write the evicted data from the SRAM 209 to the media 112 at the evicted address (from the CAM 208). In some embodiments, the processing device issues the write operation to the media channel controller 220. In some embodiments, operations 415 through 430 are performed prior to receiving a fill operation so that the fill operation can be performed without waiting on an eviction.

At block 435, the processing device determines whether the fill operation is associated with a write request or a read request. In the case of a read fill operation, operations continue to block 440. At block 440, the processing device issues a read operation to media to obtain the data stored at the address. In some embodiments, the processing device issues the read operation to the media channel controller 220. At block 445, the processing device writes the data read from the media 112 to the cache division associated with the eviction location. In particular, the processing device writes the address to the eviction location in the CAM 208, the data to the corresponding eviction location in the SRAM 209, and clears the dirty bit to indicate the data is not dirty. If entries in the CAM 208 include a valid bit, the processing device may further set the valid bit in the CAM 208. Again, the processing device may have to arbitrate for access to the cache division if the cache division is occupied by another process (e.g., the request scheduler 210). At block 450, the processing device returns the data read from media to the request scheduler 210. In some embodiments, the processing device sends the data to the request scheduler 210 (e.g., in a message or via a pointer). In other embodiments, the processing device sends an indication to the request scheduler 2101 that the read fill is complete, the indication may identify which cache division contains the data to avoid forcing the request scheduler 210 to search each of the cache divisions (see discussion of block 350 in FIG. 3, above). Again, message passing may occur either directly or via a queue.

If the processing device determines the fill operation is a write operation at block 435, at block 455, the processing device issues a write to the cache controller 206 associated with the eviction location. The write includes writing the address to the eviction location in the CAM 208, the data associated with the write to the corresponding location in the SRAM 209, and sets the dirty bit to a value to indicate the entry is dirty (to be written to media upon eviction). If entries in the CAM 208 include a valid bit, the processing device may further set the valid bit in the CAM 208.

At block 460, the processing device removes the fill operation from the fill operation queue.

Figure 5:
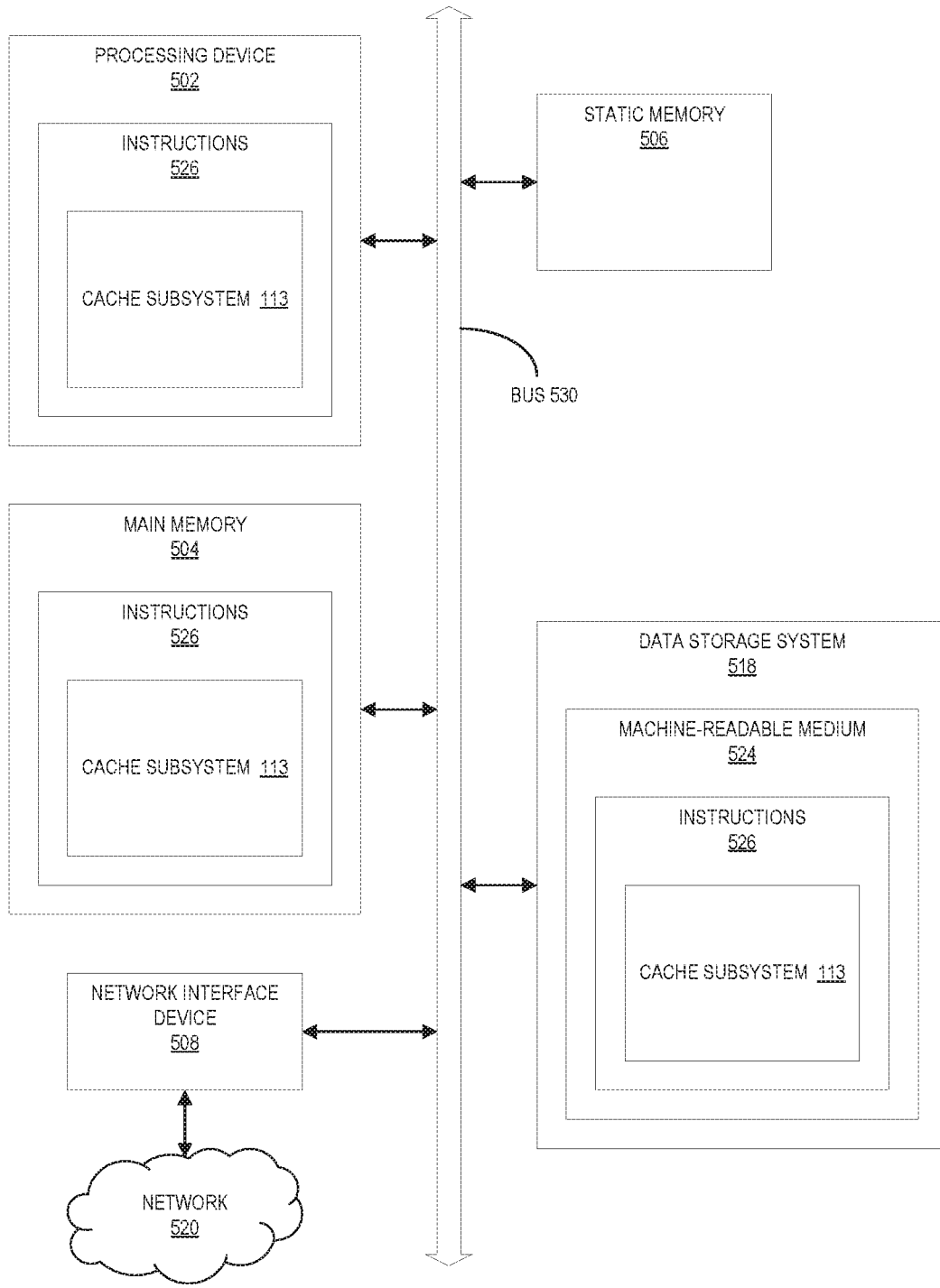
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the cache subsystem 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a cache subsystem (e.g., the cache subsystem 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 300 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
obtaining a first request to perform an operation at an address associated with a media;
issuing the operation to a plurality of cache divisions, wherein each cache division comprises a cache controller and a cache memory;
updating a location in another memory associated with the first request, the location in the other memory including a plurality of indicators corresponding to a status of the operation with each of the plurality of cache divisions, the updating including using one of the plurality of indicators to mark a corresponding cache division as checked in the performance of the operation; and
sending a response to the first request.

2. The method of claim 1, wherein the response is sent prior to completing the operation with a first cache division in the plurality of cache divisions.

3. The method of claim 1, further comprising arbitrating for access to issue the operation to each of the cache controllers within the plurality of cache divisions.

4. The method of claim 1, further comprising writing to a selected location in a first cache division in the plurality of cache divisions when the plurality of indicators in the location in the other memory indicate that a check of each cache division resulted in a miss.

5. The method of claim 4, further comprising selecting, based on a cache replacement policy, the selected location.

6. The method of claim 4, wherein the writing comprises arbitrating for access to the first cache division.

7. The method of claim 4, wherein prior to writing to the selected location:
identifying the selected location within the first cache division;
reading the selected location to obtain another address associated with the media, cached data, and a dirty bit; and
in response to the dirty bit being set, writing the cached data to the other address associated with the media.

8. A non-transitory computer-readable storage medium comprising instructions that, when executed by a processing device, cause the processing device to:
obtain a first request to perform an operation at an address associated with a media;
issue the operation to a plurality of cache divisions, wherein each cache division comprises a cache controller and a cache memory;
update a location in another memory associated with the first request, the location in the other memory including a plurality of indicators corresponding to a status of the operation with each of the plurality of cache divisions, the updating including using one of the plurality of indicators to mark a corresponding cache division as checked in the performance of the operation; and
send a response to the first request.

9. The non-transitory computer-readable storage medium of claim 8, wherein the response is sent prior to completing the operation with a first cache division in the plurality of cache divisions.

10. The non-transitory computer-readable storage medium of claim 8, wherein the processing device is further to arbitrate for access to issue the operation to each of the cache controllers within the plurality of cache divisions.

11. The non-transitory computer-readable storage medium of claim 8, wherein the processing device is further to write to a selected location in a first cache division in the plurality of cache divisions when the plurality of indicators in the location in the other memory indicate that a check of each cache division resulted in a miss.

12. The non-transitory computer-readable storage medium of claim 11, wherein the processing device is further to select, based on a cache replacement policy, the selected location.

13. The non-transitory computer-readable storage medium of claim 11, wherein the processing device is further to arbitrate for access to the first cache division to write to the selected location.

14. The non-transitory computer-readable storage medium of claim 11, wherein prior to writing to the selected location:
identifying the selected location within the first cache division;
reading the selected location to obtain another address associated with the media, cached data, and a dirty bit; and
in response to the dirty bit being set, writing the cached data to the other address associated with the media.

15. A system comprising:
a plurality of memory components; and
a processing device, operatively coupled with the plurality of memory components, to:
obtain a first request to perform an operation at an address associated with a media;
adding the first request to a queue of requests;
issue, based on a scheduling policy, the operation to a plurality of cache divisions, wherein each cache division comprises a cache controller and a cache memory;
update a location in another memory associated with the first request in the queue of requests, the location in the other memory including a plurality of indicators corresponding to a status of the operation with each of the plurality of cache divisions, the updating including using one of the plurality of indicators to mark a corresponding cache division as checked in the performance of the operation;
send a response to the first request; and
removing the first request from the queue of requests.

16. The system of claim 15, wherein the response is sent prior to completing the operation with a first cache division in the plurality of cache divisions.

17. The system of claim 15, wherein the processing device is further to arbitrate for access to issue the operation to each of the cache controllers within the plurality of cache divisions.

18. The system of claim 15, wherein the processing device is further to write to a selected location in a first cache division in the plurality of cache divisions when the plurality of indicators in the location in the other memory indicate that a check of each cache division resulted in a miss.

19. The system of claim 18, wherein the processing device is further to select, based on a cache replacement policy, the selected location.

20. The system of claim 18, wherein the processing device is further to arbitrate for access to the first cache division to write to the selected location.

* * * * *